United States Patent
Hecker et al.

(10) Patent No.: US 11,938,912 B2
(45) Date of Patent: Mar. 26, 2024

(54) REDUNDANCY ARCHITECTURE FOR SYSTEMS OF HIGH-LEVEL AUTOMATION

(71) Applicant: KNORR-BREMSE SYSTEME FUER NUTZFAHRZEUGE GMBH, Munich (DE)

(72) Inventors: Falk Hecker, Markgröningen (DE); Adnan Mustapha, Maulbronn (DE); Oliver Jundt, Hessigheim (DE)

(73) Assignee: KNORR-BREMSE SYSTEME FUER NUTZFAHRZEUGE GMBH, Munich (DE), de ( * ) Notice: Subject to any disclaimer, the term of this patent is extended or adjusted under 35 U.S.C. 154(b) by 54 days.

(21) Appl. No.: 16/756,156

(22) PCT Filed: Mar. 9, 2018

(86) PCT No.: PCT/EP2018/055985
§ 371 (c)(1),
(2) Date: Apr. 15, 2020

(87) PCT Pub. No.: WO2019/076487
PCT Pub. Date: Apr. 25, 2019

(65) Prior Publication Data
US 2020/0238961 A1 Jul. 30, 2020

(30) Foreign Application Priority Data
Oct. 16, 2017 (DE) ............. 10 2017 218 488.4

(51) Int. Cl.
*B60T 13/68* (2006.01)
*B60T 7/04* (2006.01)
(Continued)

(52) U.S. Cl.
CPC ............ *B60T 8/17* (2013.01); *B60T 7/042* (2013.01); *B60T 7/12* (2013.01); *B60T 8/176* (2013.01);
(Continued)

(58) Field of Classification Search
CPC ...... B60T 7/042; B60T 13/662; B60T 13/683; B60T 2270/402; B60T 2270/403;
(Continued)

(56) References Cited

U.S. PATENT DOCUMENTS 4,436,347 A * 3/1984 Stumpe ............... B60T 13/263
303/15
6,317,675 B1 * 11/2001 Stolzl ...................... B60T 7/042
303/155
(Continued)

FOREIGN PATENT DOCUMENTS

CN     1997540 A    7/2007
CN     101001772 A  7/2007
(Continued)

OTHER PUBLICATIONS

International Search Report dated Jun. 20, 2018 of the corresponding International Application PCT/EP2018/055985.

*Primary Examiner* — Nicholas J Lane
*Assistant Examiner* — Stephen M Bowes
(74) *Attorney, Agent, or Firm* — NORTON ROSE FULBRIGHT US LLP; Gerard A. Messina

(57) ABSTRACT

A module for providing control signals for a brake system of a vehicle which has a supply source, including: at least one interface to be connected to a compressed-air source; at least one interface to transmit the control signals to at least one processing unit for the purposes of generating brake pressures; wherein the module is configured to be provided with a supply by a further supply source. Also described are a
(Continued)

related redundancy system, an electronically controlled brake system, and a method.

16 Claims, 5 Drawing Sheets

(51) Int. Cl.

| | | |
|---|---|---|
| *B60T 7/12* | (2006.01) | |
| *B60T 8/17* | (2006.01) | |
| *B60T 8/176* | (2006.01) | |
| *B60T 8/32* | (2006.01) | |
| *B60T 8/92* | (2006.01) | |
| *B60T 13/02* | (2006.01) | |
| *B60T 13/26* | (2006.01) | |
| *B60T 13/66* | (2006.01) | |
| *B60T 13/74* | (2006.01) | |
| *B60T 17/22* | (2006.01) | |
| *B60W 30/18* | (2012.01) | |
| *B60W 50/10* | (2012.01) | |
| *B60W 60/00* | (2020.01) | |

(52) U.S. Cl.
CPC ............... *B60T 8/327* (2013.01); *B60T 8/92* (2013.01); *B60T 13/02* (2013.01); *B60T 13/268* (2013.01); *B60T 13/662* (2013.01); *B60T 13/74* (2013.01); *B60T 17/221* (2013.01); *B60W 30/18109* (2013.01); *B60W 50/10* (2013.01); *B60W 60/001* (2020.02); *B60T 2240/00* (2013.01); *B60T 2270/10* (2013.01); *B60T 2270/402* (2013.01); *B60T 2270/404* (2013.01); *B60T 2270/413* (2013.01); *B60T 2270/82* (2013.01); *B60W 2510/182* (2013.01)

(58) Field of Classification Search
CPC ......... B60T 2270/406; B60T 2270/413; B60T 2270/414; B60T 8/4818; B60T 8/88; B60T 8/92; B60T 8/94; B60T 8/327; B60T 13/36; B60T 7/12; B60T 8/17; B60T 8/176; B60T 13/02; B60T 13/268; B60T 13/74; B60T 17/221; B60T 2240/00; B60T 2270/10; B60T 2270/404; B60T 2270/82; B60W 50/10

See application file for complete search history.

(56) References Cited

U.S. PATENT DOCUMENTS

| | | | |
|---|---|---|---|
| 8,282,173 B2 * | 10/2012 | Forster | ................ B60T 13/263 |
| | | | 303/7 |
| 2007/0170774 A1 * | 7/2007 | Gerum | .................... B60T 13/66 |
| | | | 188/140 R |
| 2008/0296106 A1 * | 12/2008 | Nilsson | .................. B60T 8/885 |
| | | | 188/156 |
| 2012/0109470 A1 * | 5/2012 | Amtsfeld | ............. B60T 13/683 |
| | | | 701/48 |

FOREIGN PATENT DOCUMENTS

| | | |
|---|---|---|
| CN | 102481914 A | 5/2012 |
| DE | 102008009043 B3 | 5/2009 |
| EP | 2570316 A1 | 3/2013 |
| EP | 2570317 A1 | 3/2013 |
| JP | 2017518922 A | 7/2017 |
| WO | 2017/017491 A1 | 2/2017 |

\* cited by examiner

REDUNDANCY ARCHITECTURE FOR SYSTEMS OF HIGH-LEVEL AUTOMATION

FIELD OF THE INVENTION

The present invention relates to a module for providing control signals for a brake system of a vehicle, to a redundancy system for supplementing an electronic brake system of a vehicle, to an electronically controlled brake system for a vehicle, and to a method for operating said brake system.

BACKGROUND INFORMATION

Vehicles, in particular utility vehicles, with highly automated driving functions which take over the task of control and the responsibility for control from the driver at least for a limited time must, in the event of any fault, continue to perform the control of the vehicle until such time as the driver has resumed control of the vehicle. Furthermore, a system characteristic "fail operational" can be derived which demands that the basic functions of the vehicle, in particular at the execution level, continue to be ensured. This means that a fall-back level must be provided in the vehicle, which for example activates the wheel brakes in a manner similar to that in which a primary system would do.

Vehicles, in particular utility vehicles, are often equipped with an electronic brake system (EBS). Such systems have modules, so-called footbrake modules, which generate electronic control signals from a braking command which is for example input by the driver by means of a suitably configured interface or which is input by means of a control unit. These control signals serve for example for the activation of electronically controlled pressure control modules (electropneumatic modulators, EPM) or further modules of the EBS, which generate brake pressures from the control signals either directly or with the aid of further devices. Here, the EBS is electronically connected to a control device which controls and/or monitors all elements of the EBS. The information items relating to the operation of the EBS are transmitted to the vehicle and/or to further devices of the vehicle for example via a CAN bus, with which for example the control device communicates, and information items and commands are transmitted to the EBS via said CAN bus. Furthermore, it is conventionally the case that a supply source, for example an electric battery circuit, is provided which supplies power to the EBS. The EBS is normally controlled electronically.

Should a failure of the supply source occur, the control device is no longer capable of performing the electronic control of the EBS. A further fault situation is a failure of the EBS which causes the EBS to be no longer capable of providing brake pressures.

Commonly, in an EBS, a pneumatic fall-back level is provided which takes over the operation of the brake system in the described fault situations. This means that the footbrake module now transmits not electronic control signals but rather normally pneumatic control signals to the pressure control modules. The pressure control modules are commonly configured with a fall-back level, whereby they are capable of converting the alternative control signals, that is to say the pneumatic control signals, into brake pressures. Thus, a basic functionality of the EBS remains ensured, and the vehicle can still be controlled. This however applies only for the situation in which the driver inputs the pneumatic pressures in the EBS.

In the context of the "fail operational" system characteristic demanded above, it must however also be demanded that, in such a fault situation, the vehicle can, even during autonomous driving operation, that is to say when no driver inputs into the footbrake module are to be expected, still be braked in an electronically controlled manner, albeit possibly with functional restrictions.

A pneumatic fall-back level safeguards the "fail operational" characteristic if an external force is input into the system by a driver, for example by means of the pressure on the brake pedal. If the system is to be further developed with regard to autonomous driving operation, then an electronic fall-back level is necessary, because control commands must be at least electronically ascertained.

SUMMARY OF THE INVENTION

It is therefore an object of the present invention to enhance a conventional electronically controlled brake system such that the vehicle can still be braked in an electronically controlled manner even in a fault situation.

Said object may be achieved by the descriptions herein. The further descriptions herein relate to advantageous refinements.

According to the invention, a module for providing control signals, in particular pneumatic control signals, for a brake system of a vehicle is provided, wherein the brake system has a supply source. The module has at least one interface which is configured to be connected to a pressure accumulator, which may be to another module, particularly to a compressed-air source, whereby the module is supplied with operating pressure. The compressed-air source furthermore serves for providing compressed air for generating pneumatic control signals for the brake system.

Furthermore, at least one interface is provided which is configured to transmit the control signals to at least one processing unit. The processing units may be pneumatic pressure control modules, particularly electropneumatic valves or pressure control modules with a pneumatic fall-back level.

Said modules may be configured to provide brake pressures which may be for one axle of the vehicle, particularly in a wheel-specific manner.

The module is furthermore configured to be provided with a supply by means of a further supply source. In this way, it is advantageously ensured that the module is not provided with a supply by the supply source of the rest of the brake system. The supply source, which may be a second battery circuit, thus constitutes a redundant supply source.

Processing means may furthermore be provided, which are likewise provided with a supply by means of the further supply source and which are configured to perform the control of the module.

Said processing means may be configured for electronically controlling the module. This is ensured by means of the further supply source.

The processing means may have an electronic control device, particularly an electronic control unit, which is connected to further devices, which may be via a CAN bus of the vehicle.

At least one interface furthermore may be provided, which is configured for receiving a brake input, by means of which interface brake inputs for example from a driver or from a control unit can be received.

The processing means may be formed integrally with the module.

It is thus possible, for example, to create a compact unit composed of module and processing means, which unit can be integrated into an existing brake system.

On the module, there may be provided at least one interface which is configured to receive control signals of a first module, in particular of a footbrake module, wherein, which may be, at least one further interface is provided which is configured to transmit the control signals of the first module to the at least one processing unit.

The control signals of the first module may in this case be of electronic and/or electrical and/or mechanical and/or hydraulic and/or pneumatic form.

The module according to the invention may be configured to detect driver inputs, particularly electronically. The footbrake module is commonly configured for this purpose, by virtue of the fact that it electronically ascertains, for example, driver inputs, for example through ascertainment of the input pedal displacement.

Since the module according to the invention is not provided with a supply by the supply source of the rest of the brake system, but is instead provided with a supply separately by a further supply source, an electronic ascertainment of the driver input is advantageously possible even in the event of a failure of the first supply source, now by means of the module according to the invention.

There may be furthermore provided at least one interface which is configured to receive inputs from a driver, in order to subsequently determine control signals from said inputs.

The interface may be configured such that it can electronically receive the driver input, in particular by means of a brake pedal.

Alternatively, the driver input may also be received through the footbrake module, which driver input are provided from said footbrake module in the form of pneumatic control pressures.

Thus, in a fault situation in which only the supply source of the footbrake module has failed, it is nevertheless still possible for driver inputs to be transmitted to the module according to the invention, whereby it is ensured that a driver demand also continues to be converted into an actuation of the vehicle brakes. Furthermore, it can advantageously be achieved that control signals of the footbrake module, which are generated by the footbrake module in a fault situation in which both supply sources have failed and thus electronic control of the brake system is no longer possible, are routed through the module according to the invention.

The module may be configured to block the control signals of the footbrake module and release said control signals only when the supply to the module according to the invention has also failed.

This may be realized by means of actively electrically energized valves which open in a fault situation, that is to say in the event of a withdrawal of the electrical energization. The at least one interface which is configured to transmit the control signals of the first module to the at least one processing unit may be identical to the at least one interface which is configured to transmit the control signals to at least one processing unit.

It can advantageously be achieved in this way that the module can be incorporated into an existing EBS, which may be into the fall-back level thereof, without the need to provide additional lines, in particular control lines.

The module may be configured to, in a first fault situation, block control signals of the first module, in particular of the footbrake module, and transmit its own control signals to at least one processing unit and, in a second fault situation, block its own control signals and transmit the control signals of the first module to at least one processing unit. These may be non-electronic control signals, particularly pneumatic control signals.

The module is advantageously configured to select whether control signals of the footbrake module should be conducted onward, or its own control signals should be generated, by means of an internal logic arrangement.

This decision may also be made with the aid of a triggering signal, for example through identification of whether the EBS, in particular the footbrake module, is no longer being provided with a supply by the supply source.

The first fault situation may be characterized by a breakdown of the supply to the brake system by the first supply source, and the second fault situation is characterized by a breakdown of the supply to the brake system by the further supply source.

Thus, by means of the invention, multiple fall-back levels are created within the brake system, by means of which fall-back levels the brake system can continue to be operated in the fault situation:

Normal Operation

In a first operation level, the control of the brake system is performed in an electronically controlled manner by means of the footbrake module. The latter generates electronic control signals which cause the processing units, in particular the pressure control modules, to generate pneumatic brake pressures.

First Fault Situation

In a first fault situation, which is characterized by the failure of the first supply source, electronic control of the brake system by means of the footbrake module is no longer possible. The further processing units are no longer capable of processing electronic control signals, because they are likewise no longer provided with a supply by the first supply source. Instead, said further processing units are capable, in a fall-back level, of generating brake pressures which may be from pneumatic control signals. Said control signals may be provided in an electronically controlled manner by the module according to the invention. Said module continues to be provided with a supply by the further supply source and can electronically provide pneumatic control signals. It is thus possible, in a first fall-back level, for electronic control of the brake system to continue to be realized, and thus for control functions, such as ABS control, to advantageously also continue to be realized.

Second Fault Situation

In a second fault situation, the second supply source has also failed, as a result of which electronic control of the brake system is thus no longer possible, either by the footbrake module or by the module according to the invention. Here, the footbrake module is commonly configured to generate pneumatic control signals which can be transmitted for example directly to the processing units or via the module according to the invention to the processing units, wherein said processing units generate brake pressures from said control signals in the manner described above.

The supply to the EBS by means of the supply source and to the module according to the invention by means of the further supply source may be realized electrically.

The control signals may be, in particular in the fault situation, of not electronic but rather may be mechanical and/or pneumatic and/or hydraulic form.

In this way, it is advantageously made possible for control signals, in particular to the pressure control modules, to be generated on an alternative basis.

It may be that if, furthermore, at least one interface for receiving wheel rotational speed signals may be provided, wherein the module is configured to process the wheel rotational speed signals in the provision of the control signals.

The module according to the invention is thus advantageously capable of providing control signals for the brake system taking into consideration the wheel rotational speed signals and thus in particular taking into consideration the grip capability, which may be of the wheels of individual axles, particularly of individual wheels, and thus preventing said wheels from locking.

The module may be configured to, with the aid of the wheel rotational speed signals, provide control signals so as to prevent a locking of at least one wheel of the vehicle. This may be realized for example by means of a stuttering control signal.

It is thus also possible by means of the module according to the invention to achieve stabilization of a vehicle equipped therewith in the first fault situation.

The at least one interface of the module which is configured for receiving a brake input may be configured to receive the brake input through the first module, in particular the footbrake module, and/or through a vehicle network, which may be via a CAN bus.

The module is advantageously capable of communicating with further devices, in particular control units of the vehicle, and receiving the control commands thereof.

In a further advantageous embodiment of the invention, a redundancy system for supplementing an electronic brake system (EBS) for a vehicle is provided. Provided in such a redundancy system is a module according to the invention and at least one processing unit, which is configured to generate at least one brake pressure not electrically, in particular not in an electronically controlled manner, from a control signal.

Furthermore, a second supply source is provided which ensures the energy supply to the redundancy system independently of the rest of the EBS.

Here, the redundancy system is configured to be operated instead of the electronic brake system, which may be in a fault situation, particularly in the above-described first fault situation.

The redundancy system according to the invention thus constitutes a fall-back level of an EBS, and thereby continues to permit the electronically controlled braking of the vehicle.

The at least one processing unit may be configured to generate the at least one brake pressure mechanically and/or pneumatically and/or hydraulically.

It is thus advantageously ensured that the brake pressure is not generated in a manner dependent on the first supply source, which would not be capable of providing any supply in the first fault situation.

The redundancy system may be configured to ascertain a wheel rotational speed of at least one wheel of an axle by detection means, in particular by means of wheel rotational speed sensors, and to take said wheel rotational speed into consideration in the generation of the control signal.

Furthermore, the redundancy system may be configured to transmit the ascertained wheel rotational speeds to an electronic brake system or to other systems and components in the vehicle, which may be electronically via an existing CAN bus.

The redundancy system is thus advantageously also capable of receiving at least some of the wheel rotational speeds of the vehicle and taking these into consideration in the further creation of control signals.

In a further advantageous embodiment of the invention, an electronically controlled brake system for a vehicle is provided. This has an electronic brake system (EBS) having a supply source and having at least one processing unit which is configured to electronically generate at least one brake pressure. Furthermore, said brake system has a redundancy system, wherein the brake system is configured to provide brake pressures by means of the redundancy system, in particular in an electronically controlled manner, in the event of failure of the first supply source.

A redundant brake system is thus advantageously provided which permits electronically controlled braking even in a fault situation.

It may be provided that at least one processing unit of the redundancy system and at least one processing unit of the electronic brake system are identical.

This has the advantage that redundancy levels can be created for example within the processing units, such that the redundancy system can use existing processing units.

The electronically controlled brake system may be configured to ascertain a wheel rotational speed of at least one wheel of an axle by detection means, in particular wheel rotational speed sensors, by way of the electronic brake system and a wheel rotational speed of at least one wheel of an axle by detection means by way of the redundancy system.

Here, the redundancy system may receive one wheel rotational speed per axle. It particularly may be provided that half of the ascertained wheel rotational speeds are ascertained by means of the electronic brake system and the other half of the ascertained wheel rotational speeds are ascertained by means of the redundancy system.

It is thus advantageously the case, if both systems are operating without faults, that wheel rotational speed signals are available to all detection means in order, for example, to be able to transmit control signals to the individual pressure control modules for optimum braking interventions. Thus, the system is configured to implement functionalities, for example ABS functionalities, through the evaluation of wheel rotational speed signals.

By virtue of the fact that some of the wheel rotational speed signals are detected by means of the redundancy system, it is possible to dispense with the redundant configuration of the wheel rotational speed sensors, in particular the provision of a second sensor at a wheel. In a fault situation, that is to say if the electronic brake system is no longer active, wheel rotational speeds, which may be at least one per vehicle axle, remain available by way of the redundancy system, which is provided with a supply separately. It is thus ensured that, even in a fault situation, functionalities can be implemented, albeit in restricted form, for example in the form of axle-specific ABS functionality, through the evaluation of wheel rotational speed signals.

In a further advantageous embodiment of the invention, a method for operating an electronically controlled brake system according to the invention is provided, having the steps of providing brake pressures for the operation of the brake system by means of an electronic brake system, and changing to a redundancy system, and providing the brake pressures by means of the redundancy system, if a fault situation has occurred in the electronic brake system.

The fault situation may be the failure of the supply source.

In a further advantageous embodiment of the invention, a vehicle, in particular a utility vehicle, having a module according to the invention or having a redundancy system according to the invention or having an electronically controlled brake system according to the invention, is provided.

Below, the invention will be described on the basis of the exemplary embodiments with reference to the appended drawings.

DETAILED DESCRIPTION

Figure 1:
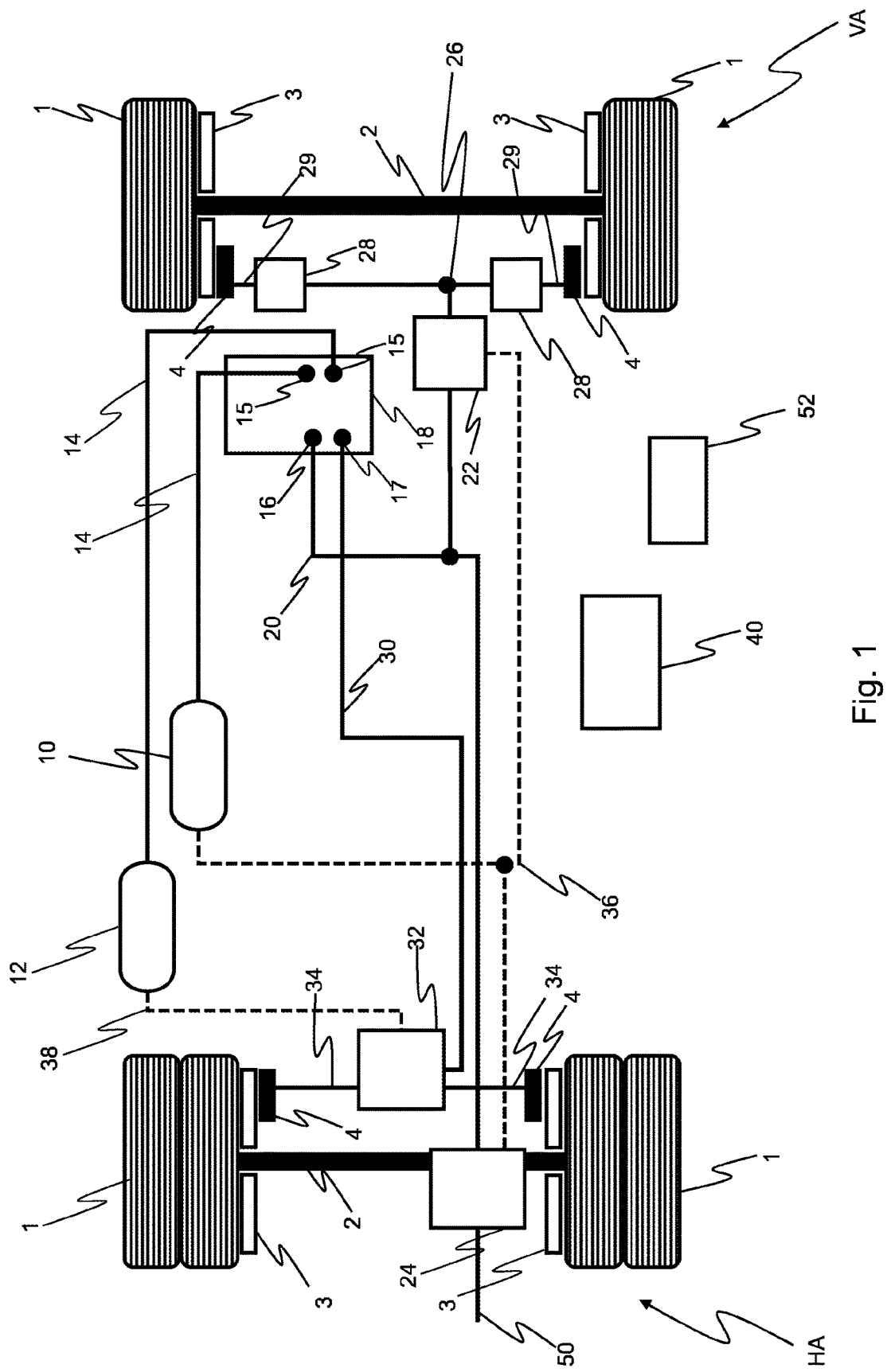
FIG. 1 shows a view of an electronic brake system (EBS) according to the prior art.

FIG. 1 shows a view of an electronic brake system (EBS) according to the prior art. A front axle VA and a rear axle HA are shown, which each have wheels 1 which are fastened rotatably to an axle 2. The wheels 1 are each assigned a brake device which, in the example shown, is configured as a friction brake. For this purpose, at each wheel 1, there is provided a brake disk 3 which is configured to come into frictional contact with a friction partner, in this case a brake pad 4. The brake disk 3 is connected rotationally conjointly to the respective wheel 1 and thus rotates jointly with the wheel 1 during travel.

To perform a braking operation, the respective brake pad 4 is brought into contact with the corresponding brake disk 3 by means of an introduced brake pressure, whereby a friction force is generated at the brake disk 3, which friction force results in a braking torque which counteracts the rotational movement of the brake disk 3 and in particular of the wheel 1.

For the sake of clarity, further components of the vehicle and in particular of the axle construction or of the construction of the brake have not been illustrated in this illustration.

Furthermore, such a brake construction is not to be seen as restricting the subject matter of the invention. It serves merely as an example in order to illustrate the operating principle of the subject matter according to the invention. Rather, alternative possible constructions of a brake are also conceivable, for example a drum brake instead of the disk brake that is shown.

Furthermore, several components of an electronic brake system are shown such as is used in vehicles, in particular utility vehicles, for performing the braking of the vehicle.

A description will be given below of the functioning of the EBS in the normal situation.

A first pressure accumulator 10 and a second pressure accumulator 12 are shown which are provided for storing compressed air. Said pressure accumulators are connected via supply lines 36, 38 to pressure control modules 22, 24, 32 and supply compressed air to these. The pressure control modules 22, 24, 32 are for example a single-channel electropneumatic modulator 22, a two-channel electropneumatic modulator 32 and a trailer module 24 for possible trailer operation. Furthermore, at the front axle VA, there are provided pressure control valves 28 which are connected via a line 26 to the pressure control module 22. Brake pressures are generated by the pressure control module 22 via the line 26 for the front axle VA, and subsequently in a wheel-specific manner by means of the pressure control valves 28 via the lines 29, and by the pressure control module 32 in a wheel-specific manner via the lines 34 for the rear axle HA. The trailer module 24 generates brake pressures for a trailer that may be present, and transmits said brake pressures via the line 50. Furthermore, a footbrake module 18 is provided which has for example an interface (not illustrated) to a driver in order to receive their inputs.

Furthermore, a control device 40, for example an electronic control unit, is provided, which is electronically connected to the elements of the EBS. For the sake of clarity, the electronic connections have not been illustrated in any of the drawings.

The EBS shown has a supply source 52, which, for example as a battery circuit, performs the supply of power to the entire electronically controlled part of the EBS.

In the normal situation, driver inputs are received through the footbrake module 18 and are electronically processed by the control device 40. From these, the control device 40 ascertains brake pressures for the individual axles VA, HA and optionally for a coupled trailer. Said brake pressures are transmitted electronically to the pressure control modules 22, 24, 32, from which these generate brake pressures as described above, wherein, for this purpose, compressed air is fed into the pressure control modules 22, 24, 32 via the supply lines 36, 38.

Here, the pneumatic fall-back level of the EBS is to be discussed in more detail below.

If for example the electrical supply from the supply source 52 fails, then electronic control of the EBS, as described above, is no longer possible. An EBS according to the prior art therefore commonly has a pneumatic fall-back level.

The pressure accumulators 10, 12 are connected via supply lines 14 to inlets 15 of the footbrake module 18. The footbrake module 18 is configured to, aside from electronic control signals in the normal situation, generate pneumatic control signals from driver inputs. These are provided via an outlet 16 and an outlet 17, wherein compressed air from the pressure accumulators 10, 12 is utilized for this purpose. These pneumatic control signals serve for the activation of the pressure control modules 22, 24, 32 of the EBS for the actuation of the vehicle brakes.

For this purpose, the pressure control modules 22, 24, 32 and furthermore the pressure control valves 28 have a pneumatic fall-back level which is configured to generate brake pressures from the pneumatic control signals. Here, the pressure control valves 28, which can now no longer be actively electrically energized or activated, switch into a pass-through position. That is to say, they conduct the brake pressure from line 26 onward, unchanged, to the lines 29. The pressure control modules 22, 24, 32 are furthermore configured to generate, from a pneumatic control signal, a brake pressure which they subsequently apply to the lines 29, 34, 50.

The EBS shown is typically of two-circuit configuration. A first circuit is shown as a front-axle circuit. This is supplied, via the outlet 16 of the footbrake module 18, with control signals which are transmitted via a branching control line 20 to the pressure control module 22 and to the trailer module 24.

In summary, the first circuit is thus formed from the first pressure accumulator 10 of a supply line 14, the footbrake module 18, the control line 20, the pressure control module 22, the trailer module 24, the line 26, the pressure control valves 28, the lines 29 and the supply line 36.

A second circuit is shown as a rear-axle circuit. The outlet 17 of the footbrake module 18 is connected via a control line 30 to the pressure control module 32. Said pressure control module 32 is of two-channel configuration. The footbrake module 18 transmits control signals by the outlet 17 and the control line 30 to the pressure control module 32.

In summary, the second circuit is thus formed from the second pressure accumulator 12, a supply line 14, an inlet 15 of the footbrake module 18, the footbrake module 18, an outlet 17 of the control line 30, the pressure control module 32, the lines 34 and the supply line 38.

The circuits shown constitute the pneumatic fall-back level of the otherwise electronically controlled brake system.

The control signals which are provided by the footbrake module 18 and which are transmitted to pressure control modules 22, 32 and to the trailer module 24 are of not electronic but rather for example pneumatic form in the fall-back level.

The illustrated configuration permits axle-specific control of the brake pressure at the front axle VA in a fault situation. Since the pressure control valves 28 are in the pass-through position, a brake pressure of the pressure control module 22 is conducted directly via the lines 26, 29 to both brakes of the front axle VA.

If the pressure control module 32 at the rear axle HA is not configured, in the fall-back level, to set the brake pressure in a wheel-specific manner, then in this case, too, merely axle-specific control of the brake pressure is possible on the basis of the pneumatic control signal from the control line 30.

Figure 2:
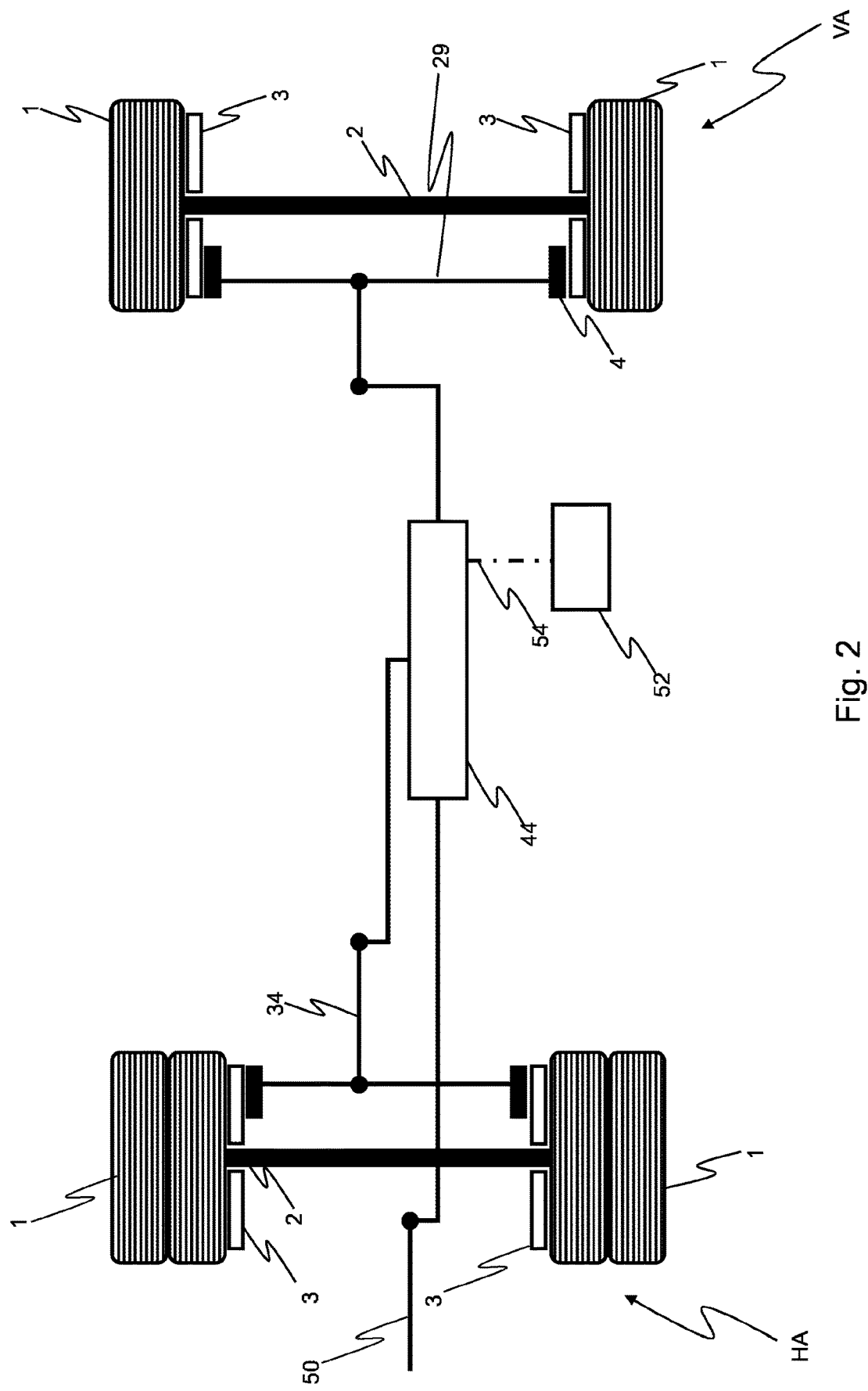
FIG. 2 is a simplified illustration of an electronic brake system (EBS) according to the prior art.

In FIG. 2, the illustrated system from FIG. 1 is summarized as an electronic brake system (EBS) 44. Only the first supply source 52 has been illustrated separately here. Furthermore, by way of example, a supply cable 54 is shown which supplies electrical current or power to the EBS 44. Here, the EBS is connected to the lines 29, 34, 50, via which, correspondingly to the illustration from FIG. 1, brake pressures are transmitted to the individual brakes or to a possible trailer. Here, for the sake of a simpler illustration, branching lines 29, 34 have been shown in each case for front axle and rear axle VA, HA. It is however also possible for embodiments to be configured with a second line 29, 34, by means of which wheel-specific braking is made possible.

Figure 3:
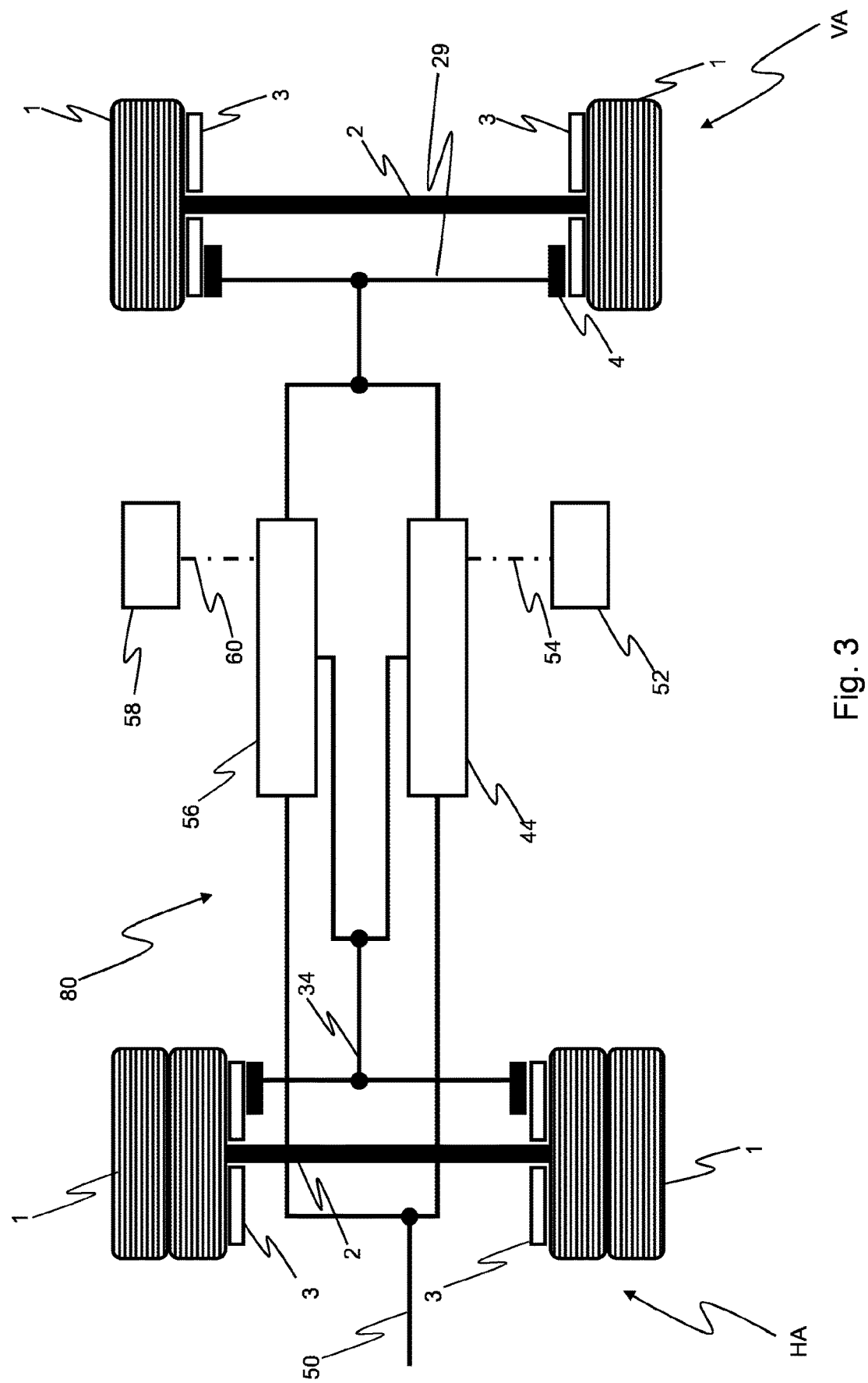
FIG. 3 is a simplified illustration of a brake system according to the invention.

FIG. 3 now shows the enhancement according to the invention of the EBS 44.

According to the invention, a brake system 80 is provided which is formed from the EBS 44 corresponding to the prior art with its supply source 52, which is supplemented by an electronically controlled redundancy system 56 which is configured to likewise generate brake pressures for the lines 29, 34, 50. The redundancy system 56 is not connected to the first supply source 52 but rather has a dedicated supply cable 60, via which said redundancy system is connected to a second supply source 58, for example a second battery circuit.

Owing to the separate power supply 52, 58 of the two systems 44, 56, the brake system 80 has a redundant configuration.

Should the first supply source 52 fail, then electronically controlled braking of the vehicle, or a provision of required brake pressures at the lines 29, 34, 50, remains possible by means of the redundancy system 56, because this can be operated by means of the second supply source 58 independently of the first supply source 52.

Figure 4:
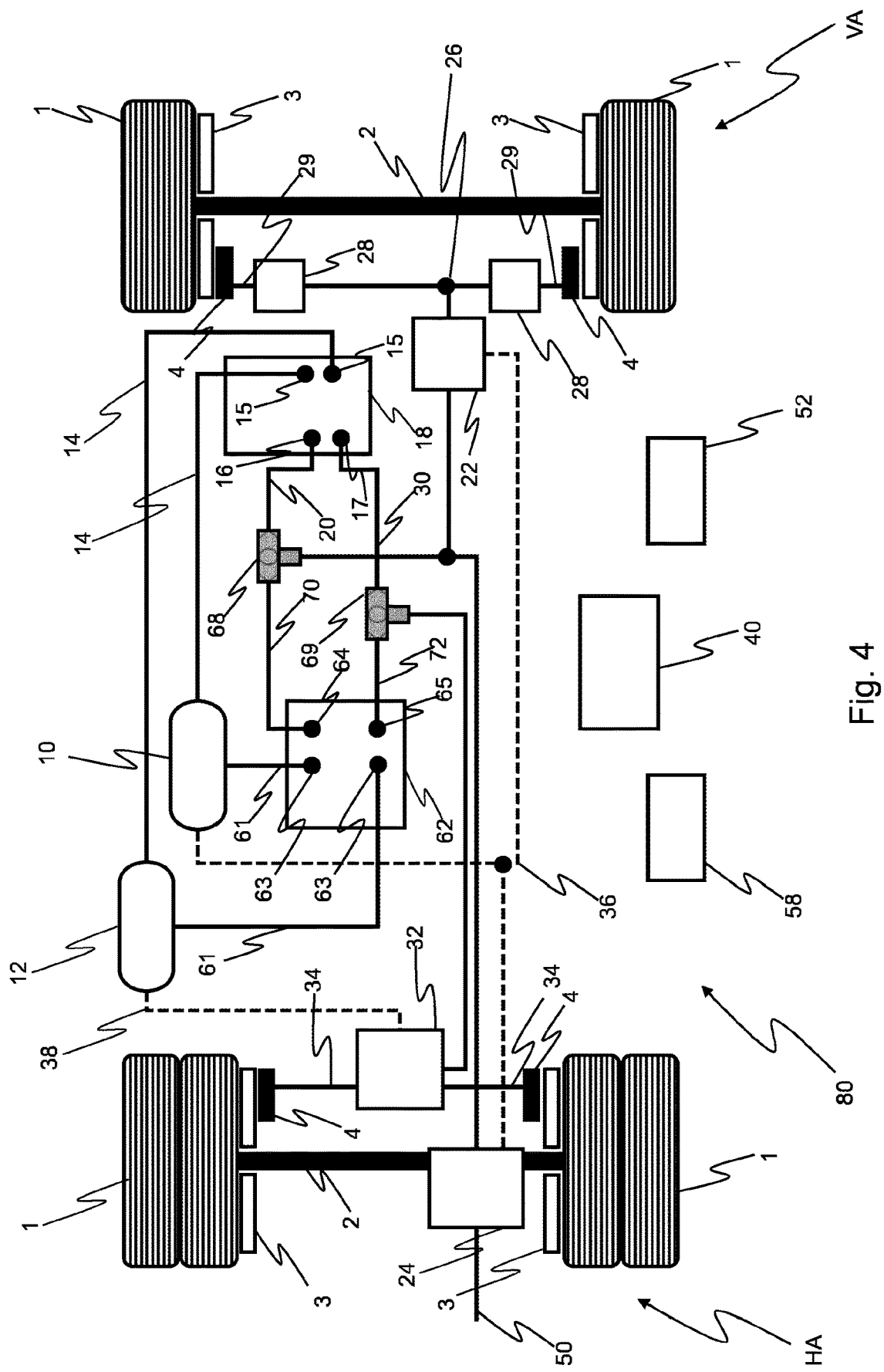
FIG. 4 shows a view of a brake system according to the invention.

FIG. 4 now takes the illustration of the electronic brake system according to the prior art from FIG. 1 and shows, in an exemplary embodiment, the expansion of said system to form a brake system 80 that is constructed in accordance with the principle from FIG. 3. An explanation of the known elements and of the operating principles thereof will not be given at this juncture, and reference is made to the description relating to FIG. 1.

A redundancy module 62 is shown which is connected via supply lines 61 and corresponding inlets 63 to the first pressure accumulator 10 and the second pressure accumulator 12.

The redundancy module 62 has, similarly to the footbrake module 18, an outlet 64 which serves as an interface to the front axle VA, that is to say via which pneumatic control signals can be transmitted to the front axle VA and/or to the trailer module 24. For this purpose, the outlet 64 is connected via a control line 70 to a shuttle valve 68. The shuttle valve 68 is in this case integrated into the control line 20, specifically upstream of the branching point to the pressure control module 22 of the front axle VA and to the trailer module 24. The shuttle valve 68 is configured to conduct control signals onward either from the footbrake module 18 or from the redundancy module 62.

Furthermore, the redundancy module 62 has a further outlet 65 which provides pneumatic control signals for the rear axle HA. For this purpose, a second shuttle valve 69 is provided in the line 30, and the outlet 65 of the redundancy module 62 is connected to said shuttle valve 69 via a control line 72.

The shuttle valve 69 is configured to transmit either control signals of the outlet 17 of the footbrake module 18 or control signals of the outlet 65 of the redundancy module 62 to the pressure control module 32 of the rear axle HA.

The redundancy module 62 is thus in contact with the fall-back level (as described above), that is to say the two circuits of the existing brake system 44.

This illustration also shows, at the bottom, the second supply source 58. The first supply source 52 supplies the constituent parts of the system in accordance with the description from FIG. 1. The second supply source 58 performs the supply of electricity to the redundancy module 62.

The above-described elements of the brake system 80 shown are, during normal operation, provided with a supply of electricity by the first supply source 52 and electronically controlled by the control device 40. In a first fault situation, that is to say for example if the first supply source 52 fails, a supply to the corresponding modules and electronic control thereof are no longer possible. For this purpose, all of the modules, in particular the pressure control module 22, the trailer module 24, the pressure control module 32 and the pressure control valves 28, are configured with a redundancy level described with regard to FIG. 1. In said redundancy level, the generation of the brake pressure is performed no longer electrically but rather purely pneumatically.

In the described fault situation, the electronic control is reduced to merely the redundancy module 62, which provides pneumatic control signals via the outlets 64, 65.

The shuttle valves 68, 69 are configured for example as valves which are actively electrically energized by the further supply source 58, and, in said state, conduct only control signals of the redundancy module 62 onward.

If said shuttle valves are no longer provided with a supply by the further supply source 58, which corresponds to a second fault situation, they close the inlets that are connected to the redundancy module 62 and instead open the inlets that are connected to the footbrake module 18, and conduct the pneumatic control signals of the footbrake module 18 onward, in a second fall-back level of purely pneumatic form, to the corresponding elements of the brake system, which pneumatically process these further as described above.

It is thus possible to maintain the functionality of the EBS 44 by means of a redundant second brake system 56, which is likewise electronically activated.

Figure 5:
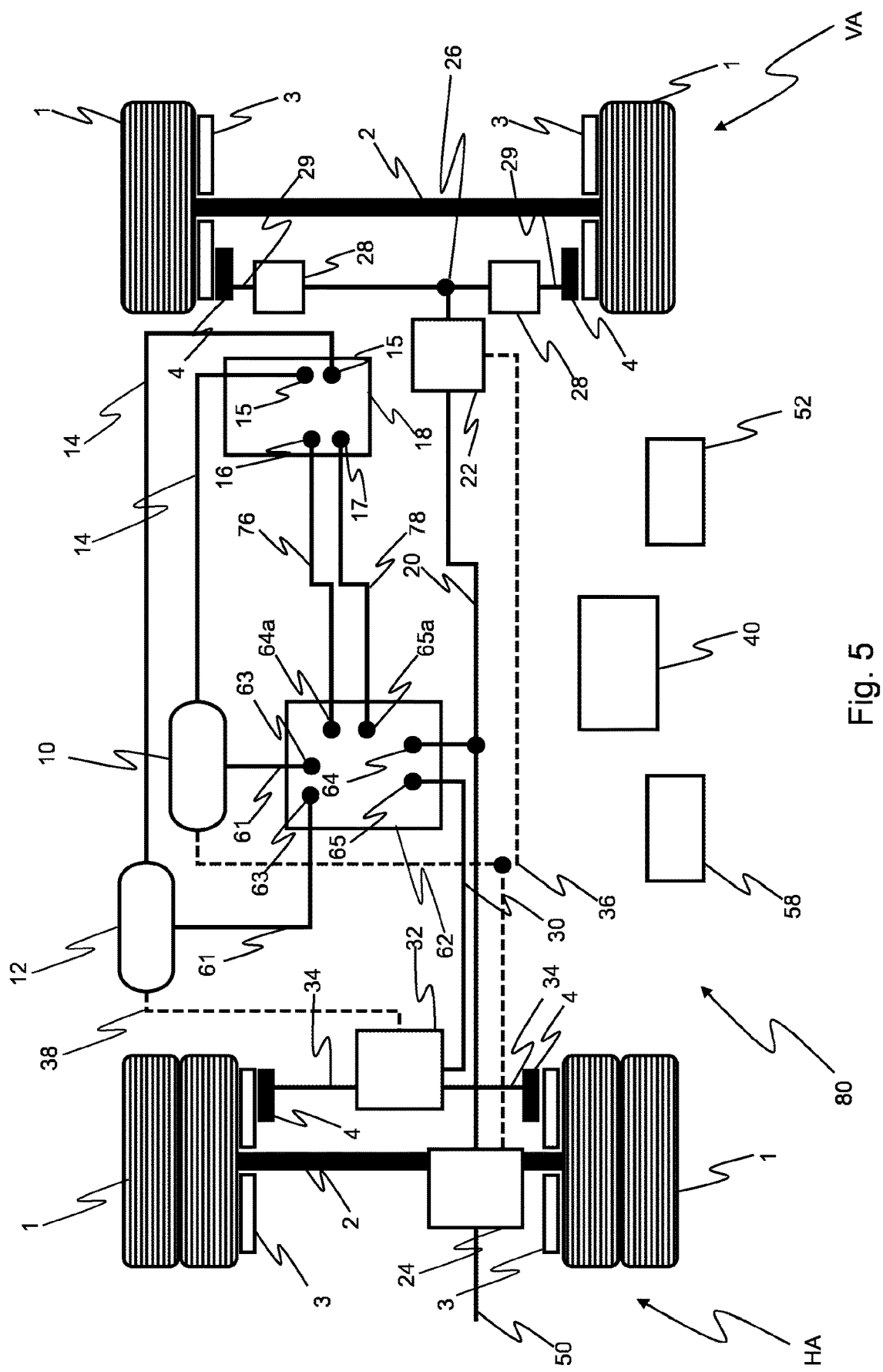
FIG. 5 shows a view of a second embodiment of the brake system according to the invention.

FIG. 5 shows a further embodiment of the brake system 80 according to the invention. The elements substantially correspond to the illustration from FIG. 4. The redundancy module 62 now has two further connectors 64a, 65a, which are connected via control lines 76, 78 to the outlets 16, 17 of the footbrake module 18. The outlets 64, 65 of the redundancy module 62 are now directly connected to the control lines 20, 30.

In this embodiment of the module 62, the shuttle valves 68, 69 from FIG. 4 are integrated into said module. This means that, in a second fault situation, that is to say if both supply sources 52, 58 have failed and electronic control of the brake system 80 as a whole is no longer possible, the pneumatic control signals of the footbrake module 18 are transmitted directly into the redundancy module 62. Within the redundancy module 62, these are conducted onward to the outlets 64, 65. In this case, the redundancy module 62 acts merely as a constituent part of the control lines 20, 30, and thus assumes a pass-through position.

In the first fault situation, that is to say if the first supply source 52 is no longer providing a supply to the brake system 44, the redundancy module 62 independently generates control signals and feeds these to the corresponding outlets 64 and 65. The redundancy module 62 is in this case configured to identify the first fault situation and block corresponding pneumatic control signals originating from the footbrake module 18 by means of the integrated shuttle valves.

The further functioning of the embodiment from FIG. 5 corresponds to that from FIG. 4.

The redundancy module 62 according to the invention from FIG. 4 and FIG. 5 is thus in contact with the first and second circuit. The pneumatic circuits are integrated in separated form within the redundancy module 62, such that the corresponding requirements of ECE R13 are also satisfied.

The illustrated embodiments of the redundancy module 62 can, owing to their configuration, be integrated into existing fall-back levels, that is to say the described circuits.

It is furthermore possible for rotational speed sensors, which are for example already present in the vehicle and which measure the rotational speeds of the individual wheels, to be connected to the redundancy module 62. The electronically controlled redundancy module 62 can, by means of the information items from the rotational speed sensors, provide a brake pressure in an axle-specific manner, which brake pressure is configured such that a locking of the wheels 1 owing to excessively intense braking is prevented. It is thus possible for an anti-lock function to be realized at least in an axle-specific manner.

Furthermore, a third fault situation is possible which consists in the failure of the second supply source 58, wherein the first supply source 52 remains active. If this is the case, then electronic control of the EBS is basically possible, wherein it is now possibly the case that data, in particular wheel rotational speeds, ascertained by means of the redundancy system 56 are no longer available. In this case, the EBS 44 can still continue operation using the remaining values and for example perform axle-specific ABS control or axle-specific control of the brake pressure.

The described embodiments show electronically controlled brake systems, or modules, which provide pneumatic control and brake pressures in a fall-back level. These embodiments do not limit the subject matter of the invention. Rather, further embodiments are conceivable in which control signals and/or brake pressures are of hydraulic form. In a further embodiment, brake actuations and/or control signals of mechanical form are also provided. Further embodiments can be formed through combination of the embodiments described above.

Furthermore, further structures of an EBS are also conceivable. For example, the construction of the pneumatic control devices of the front axle VA may also be provided at the rear axle HA, such that, here, a single-channel pressure control module 22 is now likewise provided in combination with pressure control valves 28 instead of the two-channel pressure control module 32.

It is likewise possible for a further two-channel pressure control module 32 to be provided at the front axle VA instead of the single-channel pressure control module 22 in combination with the pressure control valves 28.

A splitting of the supply to the two circuits by means of two separate pressure accumulators 10, 12 is also not imperatively necessary. The supply may also be provided by means of one or else more than two pressure accumulators.

Furthermore, an integration of the redundancy module 62 into the footbrake module 18, or a combination of the two modules into one, is conceivable.

LIST OF REFERENCE DESIGNATIONS

1 Wheel
2 Axle
3 Brake disk
4 Brake pad
10 First pressure accumulator (compressed-air source)
12 Second pressure accumulator (compressed-air source)
14 Supply line
15 Inlet, footbrake module (interface)
16 Outlet, footbrake module (interface VA)
17 Outlet, footbrake module (interface HA)
18 Footbrake module (first module)
20 Control line
22 Pressure control module (processing unit, single-channel)
24 Trailer module (processing unit)
26 Line
28 Pressure control valve
29 Line
30 Control line
32 Pressure control module (processing unit, twin-channel)
34 Line
36 Supply line
38 Supply line
40 EBS control unit (control device)
44 Electronic brake system (EBS, primary system)
50 Line
52 Supply source, EBS (power supply, first supply source)
54 Supply cable
56 Redundancy system
58 Supply source, redundancy system (power supply, second supply source)
60 Supply cable
61 Supply line
62 Redundancy module (module)
63 Inlet/interface 64 Outlet/interface
64a Interface/connector
65 Outlet/interface
65a Interface/connector
68 Shuttle valve
69 Shuttle valve
70 Control line
72 Control line
76 Control line
78 Control line
80 Brake system
HA Rear axle
VA Front axle

The invention claimed is:

1. A module for providing control signals, including electronic control signals and pneumatic control signals, for a brake system of a vehicle which has a supply source, comprising:
at least one pneumatic interface for the pneumatic control signals to be connected to a compressed-air source;
at least one electronic interface to transmit the electronic control signals to at least one processing unit for generating brake pressures;
wherein the module is configured to be provided with a supply by a second supply source, and wherein the at least one processing unit is configured to generate at least one brake pressure not in an electronically controlled manner,
wherein in a first operation level, the control of the brake system is performed in an electronically controlled manner by a footbrake module of the module, which generates the electronic control signals to cause pressure control modules of the module to generate the brake pressures,
wherein in a first fault situation, which is characterized by a failure of the supply source, electronic control of the brake system by the footbrake module is no longer possible and the at least one processing unit is no longer capable of processing the electronic control signals because they are no longer provided with a supply by the supply source, wherein the at least one processing unit is capable, in a fall-back level, of generating the brake pressures from the pneumatic control signals, wherein the electronic control signals are provided in an electronically controlled manner, wherein the module is provided with the supply by the second supply source and can electronically provide the pneumatic control signals, so that in the fall-back level, electronic control of the brake system is realized, and thus for control functions, including ABS control, continue to be realized, and
wherein in a second fault situation, the second supply source has failed, as a result of which electronic control of the brake system is thus no longer possible, either by the footbrake module or by the module, wherein the footbrake module is configured to generate the pneumatic control signals which can be transmitted to the at least one processing unit or via the module to the at least one processing unit, and wherein the at least one processing unit generates the brake pressures from the control signals, and
wherein the module is for a redundancy system for supplementing the brake system for the vehicle, and wherein the redundancy system is configured to be operated instead of the brake system.

2. The module of claim 1, wherein the supply by the supply source and by the second supply source is electrical.

3. The module of claim 1, wherein the at least one electronic interface is configured to receive a brake input through the first module and/or through a vehicle network.

4. The module of claim 1, further comprising:
a processing means, which is provided with the supply by the second supply source, to perform the control of the module; and/or
at least one interface for receiving a brake input.

5. The module of claim 4, wherein the processing means is formed integrally with the module.

6. The module of claim 1, wherein the at least one electronic interface is configured for receiving wheel rotational speed signals, and wherein the module is configured to jointly process the wheel rotational speed signals in providing the control signals.

7. The module of claim 6, wherein the module is configured to, with the wheel rotational speed signals, prevent a locking of at least one wheel as a consequence of a braking operation by a generated brake pressure of the vehicle.

8. The module of claim 1, wherein the at least one electronic interface receives the control signals of a first module of the module, and/or receives inputs from a driver.

9. The module of claim 8, wherein the module is configured to, in the first fault situation, block the control signals of the first module and transmit the control signals to the at least one processing unit and, in a second fault situation, block the control signals and transmit the control signals of the first module to the at least one processing unit.

10. The module of claim 9, wherein the first fault situation is characterized by a breakdown of the supply to the brake system by the supply source, or by a failure of a primary system, and wherein the second fault situation is characterized by a breakdown of the supply to the brake system by the second supply source, or by a failure of the redundancy system.

11. A redundancy system for supplementing a brake system, which is electronic, for a vehicle, comprising:
a module for providing control signals, including electronic control signals and pneumatic control signals, for the brake system which has a supply source, including:
at least one pneumatic interface to be connected to a compressed-air source;
at least one electronic interface to transmit the electronic control signals to at least one processing unit for generating brake pressures;
wherein the module is configured to be provided with a supply by a second supply source, and wherein the at least one processing unit is configured to generate at least one brake pressure not in an electronically controlled manner,
wherein the redundancy system is configured to be operated instead of the electronic brake system,
wherein in a first operation level, the control of the brake system is performed in an electronically controlled manner by a footbrake module of the module, which generates the electronic control signals to cause pressure control modules of the module to generate the brake pressures,
wherein in a first fault situation, which is characterized by a failure of the supply source, electronic control of the brake system by the footbrake module is no longer possible and the at least one processing unit is no longer capable of processing electronic control signals because they are no longer provided with a supply by the supply source, wherein the at least one processing unit is capable, in a fall-back level, of generating the brake pressures from the pneumatic control signals, wherein the electronic control signals are provided in an electronically controlled manner, wherein the module is provided with the supply by the second supply source and can electronically provide the pneumatic control signals, so that in the fall-back level, electronic control of the brake system is realized, and thus for control functions, including ABS control, continue to be realized, and wherein in a second fault situation, the second supply source has failed, as a result of which electronic control of the brake system is thus no longer possible, either by the footbrake module or by the module, wherein the footbrake module is configured to generate the pneumatic control signals which can be transmitted to the at least one processing unit or via the module to the at least one processing unit, and wherein the at least one processing unit generates the brake pressures from the pneumatic control signals.

12. The redundancy system of claim 11, wherein the at least one processing unit is configured to generate the at least one brake pressure mechanically and/or pneumatically and/or hydraulically, and/or wherein the redundancy system is configured to ascertain a wheel rotational speed of at least one wheel of an axle by a detection unit and to take the wheel rotational speed into consideration in the provision of the control signal.

13. A brake system, which is electronically controlled, for a vehicle, comprising:
   a brake system, which is electronic, having a supply source, including a first supply source, and at least one processing unit, to electronically generate at least one brake pressure;
   a redundancy system for supplementing the brake system, which is electronic, for the vehicle, including:
   a module for providing control signals, including electronic control signals and pneumatic control signals, for the brake system, which is electronically controlled, of the vehicle which has the supply source, including:
     at least one pneumatic interface to be connected to a compressed-air source;
     at least one electronic interface to transmit the electronic control signals to at least one processing unit for generating brake pressures;
   wherein the module is configured to be provided with another supply by a second supply source;
   at least one processing unit to generate at least one brake pressure not in an electronically controlled manner from a control signal;
   wherein the redundancy system is configured to be operated instead of the electronic brake system, which is electronic;
   wherein the brake system, which is electronically controlled, is configured to provide the brake pressures by the redundancy system for a failure of the supply source or for a failure of the brake system, which is electronic,
   wherein in a first operation level, the control of the brake system, which is electronic, is performed in an electronically controlled manner by a footbrake module of the module, which generates electronic control signals to cause pressure control modules of the module to generate the brake pressures,
   wherein in a first fault situation, which is characterized by a failure of the supply source, electronic control of the brake system, which is electronically controlled, by the footbrake module is no longer possible and the at least one processing unit is no longer capable of processing the electronic control signals because they are no longer provided with a supply by the supply source, wherein the at least one processing unit is capable, in a fall-back level, of generating the brake pressures from pneumatic control signals, wherein the electronic control signals are provided in an electronically controlled manner, wherein the module is provided with the supply by the second supply source and can electronically provide pneumatic control signals, so that in the fall-back level, electronic control of the brake system, which is electronically controlled, is realized, and thus for control functions, including ABS control, continue to be realized,
   wherein in a second fault situation, the second supply source has failed, as a result of which electronic control of the brake system, which is electronically controlled, is thus no longer possible, either by the footbrake module or by the module, wherein the footbrake module is configured to generate the pneumatic control signals which can be transmitted to the at least one processing unit or via the module to the at least one processing unit, and wherein the at least one processing unit generates the brake pressures from the pneumatic control signals.

14. The brake system of claim 13, wherein the at least one processing unit of the redundancy system and the at least one processing unit of the brake system, which is electronic, are identical, and/or the brake system, which is electronically controlled, is configured to ascertain a wheel rotational speed of at least one wheel of an axle by a detection unit by the brake system, which is electronic, and a wheel rotational speed of the at least one wheel of an axle by the detection unit by the redundancy system.

15. A method for operating a brake system, which is electronically controlled, the method comprising:
   providing brake pressures for the operation of brakes by a brake system, which is electronic, which is electronically controlled; and
   changing to a redundancy system, and providing the brake pressures by the redundancy system, for a fault situation that occurs in the brake system, which is electronic;
   wherein the brake system, which is electronically controlled, includes:
     a supply source, including a first supply source, and at least one processing unit, to electronically generate at least one brake pressure;
   wherein the redundancy system for supplementing the brake system, which is electronic, for the vehicle, includes:
     a module for providing control signals, including electronic control signals and pneumatic control signals, for the brake system, which is electronically controlled, of the vehicle which has the supply source, which includes the first supply source and a second supply source, including:
       at least one pneumatic interface to be connected to a compressed-air source;
       at least one electronic interface to transmit the electronic control signals to at least one processing unit for generating the brake pressures;
       wherein the module is configured to be provided with another supply by the second supply source;
   wherein the at least one processing unit is configured to generate at least one brake pressure not in an electronically controlled manner;

wherein the redundancy system is configured to be operated instead of the electronic brake system, which is electronic;

wherein the brake system, which is electronically controlled, is configured to provide the brake pressures by the redundancy system for a failure of the first supply source or for a failure of the brake system, which is electronic, wherein in a first operation level, the control of the brake system, which is electronic, is performed in an electronically controlled manner by a footbrake module of the module, which generates electronic control signals to cause pressure control modules of the module to generate the brake pressures, wherein in a first fault situation, which is characterized by a failure of the supply source, electronic control of the brake system, which is electronically controlled, by the footbrake module is no longer possible and the at least one processing unit is no longer capable of processing the electronic control signals because they are no longer provided with a supply by the supply source, wherein the at least one processing unit is capable, in a fall-back level, of generating the brake pressures from pneumatic control signals, wherein the electronic control signals are provided in an electronically controlled manner, wherein the module is provided with the supply by the second supply source and can electronically provide the pneumatic control signals, so that in the fall-back level, electronic control of the brake system, which is electronically controlled, is realized, and thus for control functions, including ABS control, continue to be realized, wherein in a second fault situation, the second supply source has failed, as a result of which electronic control of the brake system, which is electronically controlled, is thus no longer possible, either by the footbrake module or by the module, wherein the footbrake module is configured to generate the pneumatic control signals which can be transmitted to the at least one processing unit or via the module to the at least one processing unit, and wherein the at least one processing unit generates the brake pressures from the pneumatic control signals.

16. The method of claim 15, wherein the fault situation is the failure of the brake system, which is electronic, or of the supply source thereof.

\* \* \* \* \*